United States Patent
In et al.

(10) Patent No.: US 11,312,637 B1
(45) Date of Patent: Apr. 26, 2022

(54) YTTRIUM GRANULAR POWDER FOR THERMAL SPRAY AND THERMAL SPRAY COATING PRODUCED USING THE SAME

(71) Applicants: MICO LTD., Angeong-si (KR); KOMICO LTD., Anseong-si (KR)

(72) Inventors: Jung Hyun In, Anseong-si (KR); Sung Yong Kim, Anseong-si (KR); Hee Jin Jo, Anseong-si (KR); Dong Hun Jeong, Anseong-si (KR)

(73) Assignees: MICO LTD., Anseong-si (KR); KOMICO LTD., Anseong-si (KR)

(*) Notice: Subject to any disclaimer, the term of this patent is extended or adjusted under 35 U.S.C. 154(b) by 0 days.

(21) Appl. No.: 17/405,807

(22) Filed: Aug. 18, 2021

(30) Foreign Application Priority Data

Dec. 10, 2020 (KR) ........................ 10-2020-0172728

(51) Int. Cl.
- C01F 17/00 (2020.01)
- C01F 17/218 (2020.01)
- C01F 17/36 (2020.01)
- C01F 17/34 (2020.01)
- C23C 4/12 (2016.01)
- C23C 4/11 (2016.01)

(52) U.S. Cl.
CPC ............ *C01F 17/218* (2020.01); *C01F 17/34* (2020.01); *C01F 17/36* (2020.01); *C23C 4/11* (2016.01); *C23C 4/12* (2013.01); *C01P 2004/03* (2013.01); *C01P 2004/32* (2013.01); *C01P 2004/61* (2013.01)

(58) Field of Classification Search
CPC ........ C01F 17/218; C01F 17/34; C01F 17/36; C23C 4/10; C23C 4/04; C23C 4/11; C23C 4/12; C23C 4/134; C01P 2004/61; C04B 35/626; C04B 35/505; C04B 35/14; C04B 35/50; C04B 35/64
See application file for complete search history.

(56) References Cited

FOREIGN PATENT DOCUMENTS

| KR | 20050013968 A | 2/2005 |
|---|---|---|
| KR | 20060102766 A | 9/2006 |
| KR | 20080083600 A | 9/2008 |
| KR | 20140076588 A | 6/2014 |
| KR | 20160131918 A | 11/2016 |

*Primary Examiner* — Steven J Bos
(74) *Attorney, Agent, or Firm* — STIP Law Group, LLC

(57) ABSTRACT

Proposed is an yttrium-based granular powder for thermal spraying. The yttrium-based granular powder includes at least one yttrium compound powder selected from the group consisting of $Y_2O_3$, YOF, $YF_3$, $Y_4Al_2O_9$, $Y_3Al_5O_{12}$, and $YAlO_3$, and a silica ($SiO_2$) powder. The yttrium-based granular powder is prepared by mixing the yttrium compound powder having a mean grain diameter of 50 nm to 900 nm and the silica powder having a mean grain diameter of 50 nm to 900 nm. The yttrium-based granular powder includes less than 10 wt % of a Y—Si—O mesophase. A thermal spray coating produced using the yttrium-based granular powder can exhibit low porosity, high density, and excellent plasma resistance.

11 Claims, 3 Drawing Sheets

(a)

(b)

(c)

YTTRIUM GRANULAR POWDER FOR THERMAL SPRAY AND THERMAL SPRAY COATING PRODUCED USING THE SAME

CROSS-REFERENCE TO RELATED APPLICATION

The present application claims priority to Korean Patent Application No. 10-2020-0172728 filed on Dec. 10, 2020, the entire contents of which is incorporated herein for all purposes by this reference.

BACKGROUND OF THE INVENTION

Field of the Invention

The present disclosure relates to an yttrium-based granular powder for thermal spraying including a nanoscale yttrium compound powder and a silica constituent, and a high-density thermal spray coating produced using the same.

Description of the Related Art

In order to perform microfabrication for high circuit integration of a substrate such as a silicon wafer during the manufacture of a semiconductor, the importance of plasma dry etching is increasing day by day.

In view of such a circumstance, methods of using materials having excellent plasma resistance in a chamber member or forming a coating on the surface of the member with a material having excellent plasma resistance to extend the lifespan of the member have been proposed.

Of these, techniques to coat substrate surfaces with various materials to impart novel functionalities have been conventionally employed in various fields. One known example of such surface coating techniques is thermal spraying in which thermal spray particles made of a material such as ceramics are sprayed on the surface of a substrate in a semi-molten or molten state by means of combustion or electrical energy to form a thermal spray coating.

In general, the process of thermal spraying involves heating fine powders to a molten state, and spraying the molten powders toward a work surface of a substrate. As the sprayed molten powders are rapidly cooled down and solidified, they are deposited on and mechanically bonded to the work surface to form a coating.

Of thermal spraying techniques, plasma spraying that uses a high-temperature plasma flame to melt powders is essentially used in coating of metals and ceramics such as tungsten, molybdenum, etc., which have a high melting point. Thermal spraying improves the material characteristics of a substrate to produce a high-functional material that exhibits wear resistance, corrosion resistance, heat resistance and thermal barrier, super hardness, oxidation resistance, insulation, friction, heat dissipation, and biological function radiation resistance. Compared to other coating processes such as chemical vapor deposition, physical vapor deposition, etc., thermal spraying can provide coatings over a large area at high deposition rate.

Furthermore, in the field of fabrication of semiconductor devices, etc., in general, microfabrication is performed on the surface of a semiconductor substrate by dry etching using the plasma of a halogen-based gas such as fluorine, chlorine, bromine, etc. After the dry etching process, a chamber (vacuum container) from which the semiconductor substrate has been taken out is cleaned with an oxygen gas plasma.

In this case, there is a possibility that corrosion of members exposed to the highly reactive oxygen gas plasma or halogen gas plasma occurs inside the chamber. If corroded (eroded) portions peel off as particles from the members, these particles may adhere to the semiconductor substrate, becoming foreign substances that cause circuit defects (hereinafter referred to as "particles").

Therefore, conventionally, in equipment for fabricating semiconductor devices, in order to reduce the generation of particles, members exposed to plasma of oxygen gas or halogen gas are provided with thermal spray ceramic coatings having plasma erosion resistance.

As a cause of such particles, in addition to peeling off of reaction products adhering in the chamber, a deterioration of the chamber due to the use of halogen gas plasma or oxygen gas plasma may be cited by way of example. In addition, according to the examination of the present inventors, it was found that the number and size of particles generated from a thermal spray coating under a dry etching environment are affected by the magnitude of the bonding force between powder particles constituting the thermal spray coating, the presence of unmelted powder particles, high porosity, etc.

In particular, as the density inside a thermal spray ceramic coating increases, the degree of adsorption of a CFx-based process gas caused by defects of pores, etc. during dry etching decreases, thereby reducing etching caused by plasma ion collision.

In general, as a coating technique for forming a high-density thermal spray coating, suspension plasma spraying (SPS), aerosol deposition (AD), or physical vapor deposition (PVD) is used. However, these three techniques all have the common disadvantages of a complicated manufacturing process and high manufacturing cost compared to conventional atmospheric plasma spraying (APS).

In the case of suspension plasma spraying (SPS), the use of a relatively high temperature heat source is accompanied by an increase in process temperature during coating in a semiconductor chamber, causing product deformation. In addition, as the size of powder particles decreases, the flight distance thereof becomes shorter. This also shortens the working distance between plasma equipment and a substrate, which allows limited working. Moreover, when a liquid suspension in which water and powder particles are dispersed is injected at the same volume, the deposition rate of the coating is lowered, which requires additional processing time, resulting in an increase in manufacturing cost.

Meanwhile, aerosol deposition (AD) and physical vapor deposition (PVD) are technically limited in achieving a coating thickness of several hundred μm, and are also limited in application to substrates of complex shape.

Therefore, there is a need for a technique capable of implementing a high-density thermal spray coating using conventional atmospheric plasma spraying (APS).

As a thermal spray material for conventional APS, granular powder with a medium grain size of 30 μm to 50 μm, which is composed of granular secondary particles formed by agglomeration of primary particles of several μm, is used. In this case, as the size of droplets increases, the size of defects relatively increases during solidification of the droplets, resulting in an increase in defects in a thermal spray coating or a decrease in density.

Furthermore, when the size of the secondary particles of the granular powder is too small, the secondary particles are agglomerated by the electrostatic attraction therebetween and thus difficult to transport in the atmosphere, or tend to fail to be transported to a central frame but to be scattered elsewhere due to low particle mass.

On the other hand, a method of increasing the density of a thermal spray coating by configuring primary particles constituting a thermal spray material as small as equal to or less than 1 μm has been proposed.

However, the increase in specific surface area of the thermal spray material hinders uniform heat transfer to the primary particles inside granular powder, with the result that a coating in an unmelted or re-melted state is formed on the surface or inside of the thermal spray coating and acts as a cause of particle generation during dry etching.

As a related art, Korean Patent Application Publication No. 10-2016-0131918 (2016 Nov. 16.) discloses a thermal spray material including a rare earth element oxyhalide (RE—O—X) containing a rare earth element (RE), oxygen (O), and a halogen atom (X) as its elemental constituents. The rare earth element oxyhalide has a halogen to rare earth element molar ratio (X/RE) of equal to or greater than 1.1, thereby having improved plasma resistance and excellent porosity and hardness.

In addition, Korean Patent Application Publication No. 10-2005-0013968 (2005 Feb. 5.) discloses a plasma-resistant member containing 100 ppm to 1000 ppm of a silicon element in an yttria coating layer. The yttria coating layer has electrical properties due to containing the silicon element as a semiconductor element, so the risk of arcing exists. Furthermore, the yttria coating layer is black, which is indistinguishable from that of semiconductor process contaminants, so there is a possibility that an unnecessary cleaning process is required due to confusion during chamber cleaning.

As described above, in order to overcome physical property limitations of yttria or yttrium fluoride thermal spray materials, techniques for producing yttrium oxyfluoride thermal spraying materials that have improved physical properties such as plasma erosion resistance, porosity, and hardness by mixing yttria and yttrium fluoride have been proposed. However, there is still a continuous demand for a technology for producing a dense thermal spray coating for improving plasma resistance and a granular powder for thermal spraying for use in producing the same from an industrial point of view.

The foregoing is intended merely to aid in the understanding of the background of the present disclosure, and is not intended to mean that the present disclosure falls within the purview of the related art that is already known to those skilled in the art.

Documents of Related Art (Patent document 1) Korean Patent Application Publication No. 10-2016-0131918 (2016 Nov. 16)

(Patent document 2) Korean Patent Application Publication No. 10-2005-0013968 (2005 Feb. 5.)

SUMMARY OF THE INVENTION

Accordingly, the present disclosure has been made keeping in mind the above problems occurring in the related art, and an objective of the present disclosure is to provide a granular powder for thermal spraying, the granular powder including a nanoscale yttrium compound powder and a silica powder. The inclusion of the silica powder lowers the melting point of an yttrium-based compound, thereby suppressing the formation of pores in a thermal spray coating during the production of the thermal spray coating. Due to the fact that the boiling point of silica is lower than that the boiling point of the yttrium-based compound, the silica partially disappears during the production of the thermal spray coating, resulting in the formation of a dense yttrium-based thermal spray coating.

In order to achieve the above objective, according to one aspect of the present disclosure, there is provided an yttrium-based granular powder for thermal spraying, the yttrium-based granular powder including: at least one yttrium compound powder selected from the group consisting of $Y_2O_3$, YOF, $YF_3$, $Y_4Al_2O_9$, $Y_3Al_5O_{12}$, and $YAlO_3$; and a silica ($SiO_2$) powder, wherein the yttrium-based granular powder may be prepared by mixing the yttrium compound powder having a mean grain diameter of 50 nm to 900 nm and the silica powder having a mean grain diameter of 50 nm to 900 nm, and the yttrium-based granular powder may have a mean grain diameter of 5 μm to 50 μm and may include greater than 0 wt % and less than 10 wt % of a Y—Si—O mesophase.

In a preferred embodiment of the present disclosure, the yttrium-based granular powder may have an apparent density of 1.25 $g/cm^2$ to 1.4 $g/cm^2$.

In a preferred embodiment of the present disclosure, a weight ratio of the silicon element to the yttrium element (Si/Y) may be 0.3 to 1.00.

In a preferred embodiment of the present disclosure, the yttrium-based granular powder may be prepared by mixing 90 mass % to 99.9 mass % of the yttrium compound powder and 0.1 mass % to 10 mass % of the silica powder.

In a preferred embodiment of the present disclosure, the yttrium-based granular powder may further include at least one compound selected from the group consisting of lithium oxide (LiO), magnesium oxide (MgO), calcium oxide (CaO), and calcium carbonate ($CaCO_3$).

In a preferred embodiment of the present disclosure, the yttrium-based granular powder may be prepared by mixing 90 mass % to 99.9 mass % of the yttrium compound powder and 0.09 mass % to 9 mass % of the silica powder, and 0.01 mass % to 1 mass % of at least one compound powder selected from the group consisting of lithium oxide (LiO), magnesium oxide (MgO), calcium oxide (CaO), and calcium carbonate ($CaCO_3$).

In a preferred embodiment of the present disclosure, the yttrium-based granular powder may include greater than 0 wt % and less than 10 wt % of at least one A-Y—Si—O mesophase, wherein A may be at least one element selected from the group consisting of Li, Mg, and Ca.

According to another aspect of the present disclosure, there is provided a method of producing an yttrium-based granular powder for thermal spraying, the method including: (a) preparing a mixture by mixing at least one yttrium compound powder selected from the group consisting of $Y_2O_3$, YOF, $YF_3$, $Y_4Al_2O_9$, $Y_3Al_5O_{12}$, and $YAlO_3$, and a silica ($SiO_2$) powder; (b) preparing a granular powder by granulating the mixture; and (c) sintering the granular powder at 1200° C. to 1450° C. to obtain an yttrium-based granular powder, wherein each of the yttrium compound powder and the silica powder may have a mean grain diameter of 50 nm to 900 nm, and the yttrium-based granular powder may have a mean grain diameter of 5 μm to 50 μm and may include greater than 0 wt % and less than 10 wt % of a Y—Si—O mesophase.

According to still another aspect of the present disclosure, there is provided a method of producing an yttrium-based granular powder, the method including: (a) preparing a mixture by mixing at least one yttrium compound powder selected from the group consisting of $Y_2O_3$, YOF, $YF_3$, $Y_4Al_2O_9$, $Y_3Al_5O_{12}$, and $YAlO_3$, a silica ($SiO_2$) powder, and at least one compound powder selected from the group consisting of lithium oxide (LiO), magnesium oxide (MgO), calcium oxide (CaO), and calcium carbonate ($CaCO_3$); (b) preparing a granular powder by granulating the mixture; and (c) sintering the granular powder at 1200° C. to 1450° C. to obtain an yttrium-based granular powder, wherein each of the yttrium compound powder, the silica ($SiO_2$) powder, and the lithium oxide (LiO), magnesium oxide (MgO), calcium oxide (CaO), and calcium carbonate ($CaCO_3$) powders may have a mean grain diameter of 50 nm to 900 nm, and the yttrium-based granular powder may have a mean grain diameter of 5 µm to 50 µm and may include greater than 0 wt % and less than 10 wt % of an A-Y—Si—O mesophase, wherein A may be at least one element selected from the group consisting of Li, Mg, and Ca.

According to still another aspect of the present disclosure, there is provided an yttrium-based thermal spray coating formed on a substrate by thermal spraying of the yttrium-based granular powder produced by the method.

In a preferred embodiment of the present disclosure, the silicon element may be partially vaporized during production of the yttrium-based thermal spray coating.

According to the present disclosure, the thermal spray coating produced from the yttrium-based granular powder including the silica constituent has a significantly high density, which realizes a low etching rate at which the coating is etched by process gas during etching. Therefore, the coating can exhibit excellent durability when used as a coating material for members in a semiconductor chamber, and can be suppressed from undergoing peeling off caused by an etching phenomenon.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1A:
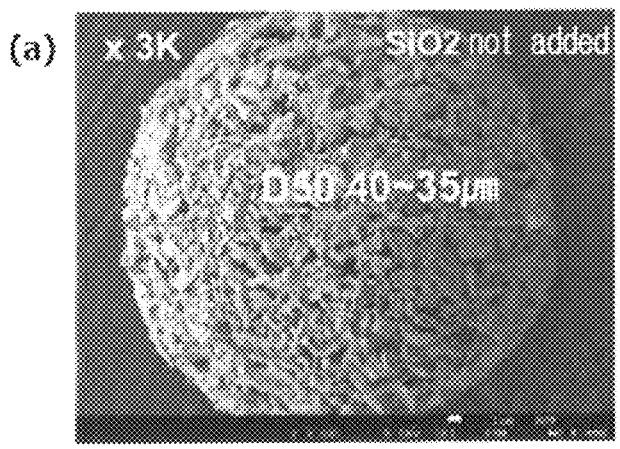
FIGS. 1A, 1B, and 1C are scanning electron microscope (SEM) images, respectively, of yttrium-based granular powders for thermal spraying according to Preparation Example 1, Preparation Example 2, and Preparation Example 4 of the present disclosure.

Unless otherwise defined, all terms including technical and scientific terms used herein have the same meaning as commonly understood by one of ordinary skill in the art to which this disclosure belongs. Generally, nomenclature used in the present specification is well known and commonly used in the art.

It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

In a semiconductor fabricating process, a gate etching device, an insulating film etching device, a resist film etching device, a sputtering device, a chemical vapor deposition (CVD) device, etc. are used. On the other hand, in a liquid crystal fabricating process, an etching device, etc. for forming a thin film transistor is used. Moreover, these devices have a configuration including a plasma generator for the purpose of high integration through microfabrication.

As a process gas in such fabricating processes, a halogen-based corrosive gas such as fluorine-based gas, chlorine-based gas, etc. is used for the above-described devices due to high reactivity thereof. Examples of the fluorine-based gas include $SF_6$, $CF_4$, $CHF_3$, $ClF_3$, HF, $NF_3$, etc., and examples of the chlorine-based gas include $Cl_2$, $BCl_3$, HCl, $CCl_4$, $SiCl_4$, etc. When microwaves, high frequency, or the like are introduced into an atmosphere into which these gases are introduced, these gases are converted into plasma. A device member exposed to these halogen-based gas or plasma thereof are required to have a very small content of metals other than material components on the surface thereof and to have high corrosion resistance. Therefore, an aspect of the present disclosure pertains to an yttrium-based granular powder for thermal spraying for use in forming a highly plasma-resistant thermal spray coating for application to a member for a plasma etching device.

The yttrium-based granular powder for thermal spraying according to the present disclosure includes at least one yttrium compound powder selected from the group consisting of $Y_2O_3$, YOF, $YF_3$, $Y_4Al_2O_9$, $Y_3Al_5O_{12}$, and $YAlO_3$, and a silica ($SiO_2$) powder. The yttrium-based granular powder for thermal spraying is prepared by mixing the yttrium compound powder having a mean grain diameter of 50 nm to 900 nm and the silica powder having a mean grain diameter of 50 nm to 900 nm. The yttrium-based granular powder for thermal spraying includes less than 10 wt % of a Y—Si—O mesophase.

The yttrium-based granular powder includes, as constituents thereof, any one or at least two selected from the group consisting of $Y_2O_3$, YOF, $YF_3$, $Y_4Al_2O_9$, $Y_3Al_5O_{12}$, and $YAlO_3$, and silica ($SiO_2$) in addition to an yttrium-based compound so as to reduce the melting point of the yttrium-based compound. This suppresses the formation of pores in the thermal spray coating during the production of the thermal spray coating. Therefore, the yttrium-based granular powder is advantageous for producing a dense yttrium-based thermal spray coating with low porosity.

In this case, in order to improve the density of the granular powder itself, the yttrium compound powder selected from the group consisting of $Y_2O_3$, YOF, $YF_3$, $Y_4Al_2O_9$, $Y_3Al_5O_{12}$, and $YAlO_3$ and the silica powder preferably each has a mean grain diameter of 50 nm to 900 nm, and more preferably 150 nm to 800 nm.

When the mean grain diameter of the yttrium compound powder and the silica powder is less than about 50 nm, a Y—Si—O mesophase may be generated. In addition, when preparing slurry for producing the granular powder, the content of a dispersed organic material is increased. This dispersed organic material disappears during heat treatment, resulting in formation of pores, making it difficult to prepare a high-density granular powder. On the other hand, when the mean grain diameter of the yttrium compound powder and the silica powder as primary particles exceeds about 900 nm, surface roughness in the thermal spray coating may increase, resulting in generation of particles during semiconductor etching.

As an example, when the mean grain diameter of the yttrium compound powder and the silica powder in the granular powder is 50 nm to 900 nm, apparent density of the granular powder is 1.25 g/cm$^2$ to 1.4 g/cm$^2$, which is preferable from the viewpoint of producing a dense thermal spray coating.

In the yttrium-based granular powder for thermal spraying, preferably, the yttrium compound is included in a content of 90 mass % to 99.9 mass %, the silica is included in a content of 0.1 mass % to 10 mass %. More preferably, the yttrium compound is included in a content of 95 mass % to 99.5 mass %, and the silica is included in a content of 0.5 mass % to 5 mass %.

When the content of the silica is less than 0.1 mass %, the effect of lowering the melting point of the silica during the production of the thermal spray coating is insignificant. On the other hand, when the content thereof exceeds 10 mass %, the constituent to be disappeared in the form of silica (SiO$_2$) is converted into a Y—Si—O mesophase, remaining in the thermal spray coating, or becomes partially amorphous. This may reduce plasma resistance and increase the possibility of particle generation.

Due to the fact that the boiling point of the silica is lower than the melting point of the yttrium compound, the silica is partially or totally vaporized while the granular powder is liquefied and scattered during the production of the thermal spray coating, which provides an effect of lowering the melting point of the yttrium-based granular powder for thermal spraying. As a result, the content of the silica remaining in the thermal spray coating is reduced compared to before being fed to process of producing the thermal spray coating.

The difference in the mean grain diameter between the silica powder and the yttrium compound powder is preferably equal to or less than 30%. When the mean grain diameter of the silica powder is at least 30% greater than that of the yttrium compound powder, an excess amount of Y—Si—O mesophase may be generated during coating formation.

The mean grain diameter of the yttrium-based granular powder for thermal spraying according to the present disclosure may be 5 μm to 50 μm, preferably 10 μm to 40 μm, and more preferably 15 μm to 30 μm.

When the mean grain diameter of the yttrium-based granular powder for thermal spraying is less than 5 μm, during thermal spraying, the granular powder has low fluidity, making it difficult to implement a uniform coating. In addition, the granular powder is oxidized before being transported to a frame or fails to be transported to the center of the frame, so it is difficult to satisfy sufficient droplet flying speed and heat quantity to form a dense coating, resulting in a coating with high porosity or low hardness. When the mean grain diameter of the yttrium-based granular powder for thermal spraying exceeds 50 μm, the granular powder is not completely melted due to reduced melt specific surface area thereof, generating an unmelted portion in the coating, which makes it difficult to satisfy thermal spray coating quality required by the present disclosure.

The aspect ratio of the yttrium-based granular powder for thermal spraying according to the present disclosure is expressed as the ratio of the long diameter to the short diameter thereof. The aspect ratio is equal to or greater than 1.0 and equal to or less than 5.0, which is preferable from the viewpoint of forming a dense and uniform coating. From this viewpoint, the aspect ratio is more preferably equal to or greater than 1.0 and equal to or less than 4.0, and particularly preferably equal to or greater than 1.0 and equal to or less than 1.5.

As far as the yttrium-based granular powder for thermal spraying is concerned, fluidity is an important factor that determines the quality of the thermal spray coating. Therefore, it is most preferable that the granular powder has a spherical shape. Otherwise, during the production of the thermal spray coating, a given amount of powder may not be transported to the frame, making it difficult to implement a coating which satisfies requirements of the present disclosure.

As an example, the silicon element may be partially vaporized during the production of the thermal spray coating, and the weight ratio of the silicon element to the yttrium element (Si/Y) in the yttrium-based granular powder for thermal spraying may be 0.3 to 1.00.

It is preferable that the yttrium-based granular powder for thermal spraying according to the present disclosure does not include a Y—Si—O mesophase, or includes less than 10 wt % of at least one Y—Si—O mesophase.

When the content of the Y—Si—O mesophase is equal to or greater than 10 wt %, the silicon element (Si) reacts with halogen-based corrosive gas to vaporize, thereby increasing the possibility of generating voids. The resulting voids may act as penetration paths through which a process gas such as corrosive gas penetrates, generating particles.

The yttrium-based granular powder for thermal spraying according to the present disclosure may further include, in addition to silica (SiO$_2$), at least one compound selected from the group consisting of lithium oxide (LiO), magnesium oxide (MgO), calcium oxide (CaO), and calcium carbonate (CaCO$_3$) in order to lower the melting point of the yttrium-based compound. This provides an effect of lowering the melting point of the yttrium-based granular powder for thermal spraying while the granular powder is liquefied and scattered, thereby suppressing the formation of pores in the thermal spray coating.

The yttrium-based granular powder for thermal spraying may be prepared by mixing 90 mass % to 99.9 mass % of the yttrium compound powder and 0.09 mass % to 9 mass % of the silica powder, and 0.01 mass % to 1 mass % of at least one compound powder selected from the group consisting of lithium oxide (LiO), magnesium oxide (MgO), calcium oxide (CaO), and calcium carbonate (CaCO$_3$).

As an example, the yttrium-based granular powder for thermal spraying may be prepared by mixing 90 mass % to 99.9 mass % of the yttrium compound powder, 0.09 mass % to 9 mass % of the silica powder, and 0.01 mass % to 1 mass % of a lithium oxide powder.

As an example, the granular powder may be prepared by mixing 90 mass % to 99.9 mass % of the yttrium compound powder, 0.09 mass % to 9 mass % of the silica powder, and 0.01 mass % to 1 mass % of a magnesium oxide powder.

When further including at least one compound selected from the group consisting of lithium oxide (LiO), magnesium oxide (MgO), calcium oxide (CaO), and calcium carbonate (CaCO$_3$) in addition to silica (SiO$_2$), it is preferable that the yttrium-based granular powder for thermal spraying does not include an AY—Si—O mesophase including at least one of lithium (Li), magnesium (Mg) and calcium (Ca), or includes less than 10 wt % of at least one A-Y—Si—O mesophase (where A is at least one element selected from the group consisting of Li, Mg, and Ca).

Furthermore, the present disclosure provides a method of producing an yttrium-based granular powder for thermal spraying. The method includes the steps of: (a) preparing a mixture by mixing at least one yttrium compound powder selected from the group consisting of $Y_2O_3$, YOF, $YF_3$, $Y_4Al_2O_9$, $Y_3Al_5O_{12}$, and $YAlO_3$, and a silica ($SiO_2$) powder; (b) preparing a granular powder by granulating the mixture; and (c) sintering the granular powder at 1200° C. to 1450° C. to obtain an yttrium-based granular powder. The yttrium compound powder and the silica powder each has a mean grain diameter of 100 nm to 900 nm, and the yttrium-based granular powder for thermal spraying includes less than 10 wt % of a Y—Si—O mesophase.

Hereinafter, the method of preparing an yttrium-based granular powder for thermal spraying according to the present disclosure will be described in detail below.

In the yttrium-based granular powder for thermal spraying according to the present disclosure, since at least one yttrium compound powder selected from the group consisting of $Y_2O_3$, YOF, $YF_3$, $Y_4Al_2O_9$, $Y_3Al_5O_{12}$, and $YAlO_3$ and the silica ($SiO_2$) powder, which are as primary particles, have a fluidity that does not reach the level required for thermal spraying, it is preferable to configure a spherical granular powder through mixing, granulation, and sintering.

In step (a), the at least one yttrium compound powder selected from the group consisting of $Y_2O_3$, YOF, $YF_3$, $Y_4Al_2O_9$, $Y_3Al_5O_{12}$, and $YAlO_3$ and the silica ($SiO_2$) powder are mixed with a sintering aid and a dispersion medium to obtain a mixture. If necessary, slurry droplets may be prepared by further adding a binder to the mixture.

In this case, in order to improve the density of the granular powder itself and surface roughness of a final thermal spray coating, the yttrium compound powder selected from the group consisting of $Y_2O_3$, YOF, $YF_3$, $Y_4Al_2O_9$, $Y_3Al_5O_{12}$, and $YAlO_3$ and the silica powder preferably each has a mean grain diameter of 50 nm to 900 nm.

It is preferable that the yttrium-based granular powder for thermal spraying according to the present disclosure does not include a Y—Si—O mesophase, or includes less than 10 wt % of at least one Y—Si—O mesophase. When the content of the Y—Si—O mesophase is equal to or greater than 10 wt %, the silicon element (Si) reacts with halogen-based corrosive gas to vaporize, thereby increasing the possibility of generating voids. The resulting voids may act as penetration paths through which a process gas such as corrosive gas penetrates, generating particles.

The yttrium-based granular powder for thermal spraying according to the present disclosure may further include, in addition to silica ($SiO_2$), at least one compound selected from the group consisting of lithium oxide (LiO), magnesium oxide (MgO), calcium oxide (CaO), and calcium carbonate ($CaCO_3$) in order to lower the melting point of the yttrium-based compound. This provides an effect of lowering the melting point of the yttrium-based granular powder for thermal spraying to suppress the formation of pores in the thermal spray coating, thereby making it possible to produce a dense yttrium-based thermal spray coating with low porosity.

In this case, in order to improve the density of the granular powder itself, the lithium oxide (LiO), magnesium oxide (MgO), calcium oxide (CaO), and calcium carbonate ($CaCO_3$) powders preferably each has a mean grain diameter of 50 nm to 900 nm.

Furthermore, the present disclosure provides a method of producing an yttrium-based granular powder for thermal spraying. The method includes the step of (a) preparing a mixture by mixing at least one yttrium compound powder selected from the group consisting of $Y_2O_3$, YOF, $YF_3$, $Y_4Al_2O_9$, $Y_3Al_5O_{12}$, and $YAlO_3$, a silica ($SiO_2$) powder, and at least one compound powder selected from the group consisting of lithium oxide (LiO), magnesium oxide (MgO), calcium oxide (CaO), and calcium carbonate ($CaCO_3$). The yttrium compound powder, the silica powder, and the lithium oxide (LiO), magnesium oxide (MgO), the calcium oxide (CaO), and calcium carbonate ($CaCO_3$) powders may each have a mean grain diameter of 50 nm to 900 nm. The yttrium-based granular powder for thermal spraying may include less than 10 wt % of at least one A-Y—Si—O mesophase (where A is at least one element selected from the group consisting of Li, Mg, and Ca).

As an example, the method of producing the yttrium-based granular powder for thermal spraying includes the step of (a) preparing a mixture by mixing at least one yttrium compound powder selected from the group consisting of $Y_2O_3$, YOF, $YF_3$, $Y_4Al_2O_9$, $Y_3Al_5O_{12}$, and $YAlO_3$, a silica ($SiO_2$) powder, and a lithium oxide (LiO) powder. The yttrium compound powder, the silica powder, and the lithium oxide (LiO) powder each has a mean grain diameter of 50 nm to 900 nm. The yttrium-based granular powder for thermal spraying may include less than 10 wt % of a Y—Si—O mesophase and an A-Y—Si—O mesophase.

As an example, the method of producing the yttrium-based granular powder for thermal spraying includes the step of (a) preparing a mixture by mixing at least one yttrium compound powder selected from the group consisting of $Y_2O_3$, YOF, $YF_3$, $Y_4Al_2O_9$, $Y_3Al_5O_{12}$, and $YAlO_3$, a silica ($SiO_2$) powder, and a magnesium oxide (MgO) powder. The yttrium compound powder, the silica powder, and the magnesium oxide (MgO) powder may each have a mean grain diameter of 50 nm to 900 nm. The yttrium-based granular powder for thermal spraying may include less than 10 wt % of a Y—Si—O mesophase and an A-Y—Si—O mesophase.

The binder is preferably an organic compound. Examples of the organic compound include, but are not limited to, an organic compound consisting of: carbon; hydrogen and oxygen; or carbon, hydrogen, oxygen, and nitrogen, such as carboxymethylcellulose (CMC), polyvinyl alcohol (PVA), polyvinylpyrrolidone (PVP), etc.

Thereafter, in step (b), the mixture including the yttrium compound powder and the silica ($SiO_2$) powder is subjected to a granulation process to obtain the granular powder. As a granulation device, e.g., a spray-drying device may be used. In the spray drying device, slurry droplets including a plurality of powder particles are dropped through the hot air. As a result of solidification of the droplets, intermediate granules made up of agglomerated particles are formed.

Finally, in step (c), the granular powder is subjected to a sintering process. The sintering temperature is preferably 1200° C. to 1450° C. With the sintering in this temperature range, the yttrium compound powder and the silica ($SiO_2$) powder in the granular powder are physically combined.

The sintering time is preferably equal to or greater than two hours and equal to or less than eight hours under the condition in which the sintering temperature is within the above range.

The sintering atmosphere may be an oxygen-containing atmosphere such as an atmospheric atmosphere, but preferably is an inert gas atmosphere such as argon gas or a vacuum atmosphere.

The present disclosure provides an yttrium-based granular powder for thermal spraying produced by the method of producing the yttrium-based granular powder for thermal spraying.

Furthermore, the present disclosure provides an yttrium-based thermal spray coating that is produced on a substrate by thermal spraying of the yttrium-based granular powder for thermal spraying.

The thermal spraying of the granular powder may be performed using any one of flame spraying, wire arc spraying, plasma spraying, vacuum plasma spraying, high-velocity oxygen fuel (HVOF) spraying, low-temperature spraying, and detonation spraying.

Plasma spraying techniques here include coating techniques in general in which a thermal spray material is introduced into a plasma jet, heated, accelerated, and deposited on a substrate to obtain a thermal spray coating. The mode of plasma spraying may be atmospheric plasma spraying (APS) performed in atmosphere, low-pressure plasma spraying (LPPS) performed at a pressure lower than atmospheric pressure, or high-pressure plasma spraying (HPPS) performed in a container at a pressure higher than atmospheric pressure. With this plasma spraying, for example, it is possible to melt and accelerate a thermal spray material by means of a 10000 K to 15000 K plasma jet, and deposit thermal spray powder particles by propelling them onto a substrate at a speed of about 300 m/s to 1,000 m/s.

In the present disclosure, the substrate coated with the thermal spray coating is particularly limited. For example, the material or shape of the substrate is not particularly limited, as long as it is a substrate that includes a material capable of exhibiting desired resistance. The material constituting the substrate is preferably selected from a combination of at least one of aluminum, nickel, chromium, zinc, and alloys thereof constituting a member for semiconductor fabricating equipment, etc., alumina, aluminum nitride, silicon nitride, silicon carbide, and quartz glass.

The substrate is, e.g., a member constituting semiconductor device fabricating equipment, and may be a member exposed to a highly reactive oxygen gas plasma or halogen gas plasma.

The surface of the substrate is preferably processed based on the ceramic thermal spraying operation standard prescribed in JIS H 9302 before plasma spraying. For example, after removing rust and oils from the surface of the substrate, the surface is roughened by spraying abrasive particles such as $Al_2O_3$ and SiC, and then pre-treated into a state in which the thermal spray powder particles tend to adhere.

Furthermore, the thermal spray coating may be formed by feeding a thermal spray material disclosed here to a thermal spray device based on a well-known thermal spraying technique other than plasma spraying. Suitable examples of thermal spraying techniques for thermally spraying the thermal spray material include high-velocity oxygen fuel spraying, flame spraying, detonation spraying, etc.

The characteristics of the thermal spray coating may depend to some extent on thermal spraying techniques and conditions thereof. However, no matter which thermal spraying technique and thermal spraying conditions are employed, the use of the thermal spray material disclosed here makes it possible to form a dense thermal spray coating with low porosity compared to the case of using other thermal spraying materials.

In a conventional yttrium-based thermal spray coating, mechanical defects such as pores and cracks existing inside and on the surface of a coating layer and high surface roughness are vulnerable to being affected by chemical/physical impacts occurring during etching, and thus may act as a potential risk factor that causes particle generation due to deterioration of the coating layer, etc.

Meanwhile, in the present disclosure, a nanoscale yttrium-based powder is used as primary particles and a silica constituent is further used to lower the melting point of the yttrium-based compound to suppress the formation of pores in the thermal spray coating during the production of the thermal spray coating. As the silica constituent naturally disappears during a high-temperature process for the production of the coating, a dense yttrium-based thermal spray coating with low porosity is obtained.

As an example, the yttrium-based thermal spray coating formed by the method of producing the yttrium-based thermal spray coating according to the present disclosure may have a porosity of less than 2%, preferably less than 1.5%, and more preferably less than 1%.

Therefore, the yttrium-based thermal spray coating according to the present disclosure has a superior porosity level compared to the conventional thermal spray coating. As a result, when applied to a semiconductor chamber used in an etching process, the yttrium-based thermal spray coating exhibits excellent durability and is suppressed from undergoing the phenomenon in which the coating peels off by etching gas.

As an example, in the method of producing the yttrium-based thermal spray coating, the silicon element may be partially vaporized during the production of the thermal spray coating, and thus the weight ratio of the silicon element to the yttrium element (Si/Y) may be 0.3 to 1.00

In the yttrium-based thermal spray coating according to the present disclosure, when the yttrium compound is yttria ($Y_2O_3$), the yttria may include 70% to 90% of a monoclinic crystal structure. In this case, it is interpreted that the monoclinic crystal structure of the yttria ($Y_2O_3$) provides an effect of increasing bonding strength between yttria powders, thereby contributing to the formation of fine pores in the thermal spray coating.

It is preferable that the yttrium-based thermal spray coating according to the present disclosure does not include a Y—Si—O mesophase, or includes less than 10 wt % of at least one Y—Si—O mesophase.

When the content of the Y—Si—O mesophase is equal to or greater than 10 wt %, the silicon element (Si) reacts with halogen-based corrosive gas to vaporize, thereby increasing the possibility of generating voids. The resulting voids may act as penetration paths through which a process gas such as corrosive gas penetrates, generating particles.

In addition, the generation of the Y—Si—O mesophase may result in the formation of a non-homogeneous coating, causing difficulty in imparting uniform functional properties.

On the other hand, when equal to greater than 10 wt % of a mesophase including at least one element of Li, Mg, and Ca exists in the yttrium-based thermal spray coating, the same phenomenon occurs.

Hereinafter, the present disclosure will be described in more detail through examples. However, the following examples are merely illustrative of the present disclosure, and the present disclosure is not limited thereby.

Preparation Examples 1 to 2

In each Preparation Example, an yttria granular powder having a mixing ratio of yttrium to oxygen of 78/22 was used.

Figure 1B:
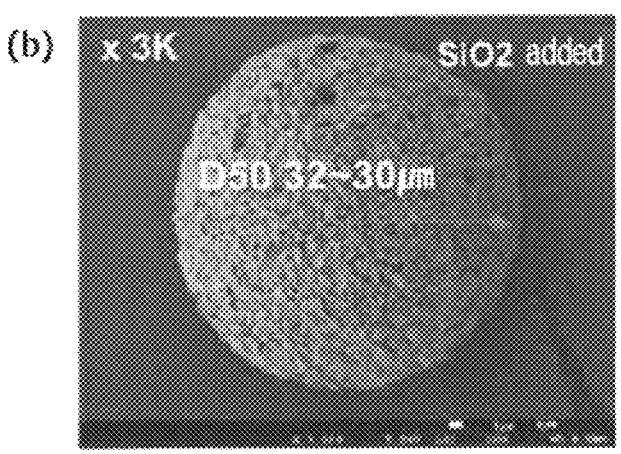
Figure 1C:
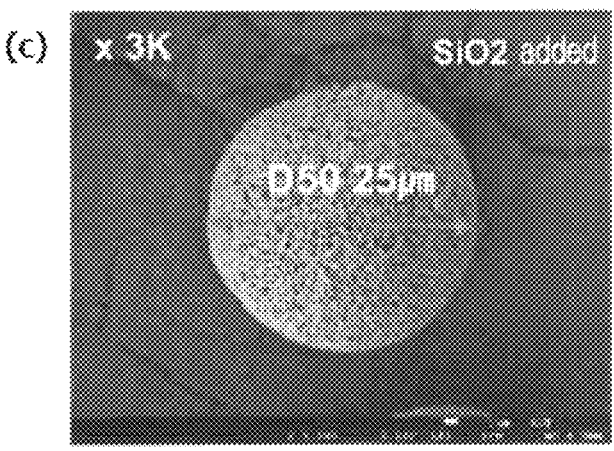

After mixing a binder with an yttria powder and a silica powder, the resulting mixture was granulated by a spray dryer to obtain a granular powder. The granular powder was then degreased and sintered to obtain a final yttria granular powder. Experimental conditions such as the size and mixing ratio of the yttria powder and the silica powder used in each Preparation Example are illustrated in Table 1 below, and scanning electron microscope (SEM) images of prepared granular powders are illustrated in FIGS. 1A, 1B, and 1C.

TABLE 1

| | Constituent | Grain size (μm) | Mixing ratio of primary particles (wt %) | Apparent density (g/cm³) |
|---|---|---|---|---|
| Preparation Example 1 | Y₂O₃ | 4~10 | 99.0 | 1.1~1.15 |
| | SiO₂ | — | — | |
| Preparation Example 2 | Y₂O₃ | 4~10 | 99.0 | 1.15~1.25 |
| | SiO₂ | 0.3~0.9 | 1.0 | |
| Preparation Example 3 | Y₂O₃ | 0.3~0.9 | 99.0 | 1.15~1.25 |
| | SiO₂ | — | — | |
| Preparation Example 4 | Y₂O₃ | 0.3~0.9 | 99.0 | 1.25~1.4 |
| | SiO₂ | 0.3~0.9 | 1.0 | |
| Preparation Example 5 | Y₂O₃ | 0.3~0.9 | 90.0 | |
| | SiO₂ | 0.3~0.9 | 10.0 | |
| Preparation Example 6 | Y₂O₃ | 0.3~0.9 | 65.0 | |
| | SiO₂ | 0.3~0.9 | 35.0 | |
| Preparation Example 7 | Y₂O₃ | 0.3~0.9 | 50.0 | |
| | SiO₂ | 0.3~0.9 | 50.0 | |

As illustrated in Table 1 above, Preparation Example 4 including a nanoscale yttrium-based compound powder exhibits a higher apparent density than Preparation Example 2 including a microscale yttrium-based compound powder.

Comparative Examples 1 to 2 and Example 1

Figure 2A:
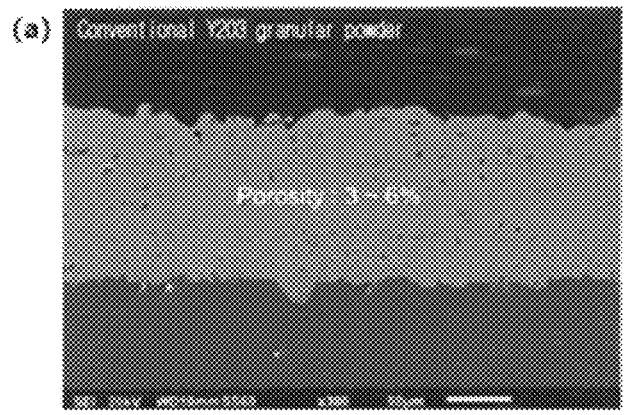
FIGS. 2A, 2B, and 2C are side scanning electron microscope (SEM) images, respectively, of thermal spray coatings according to Comparative Example 1, Comparative Example 2, and Example 1 of the present disclosure.
Figure 2B:
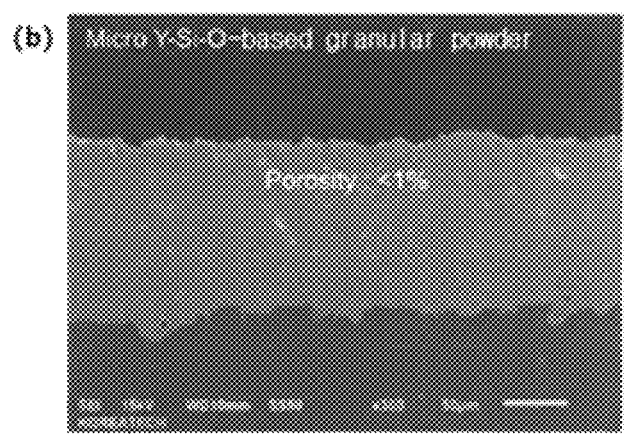
Figure 2C:
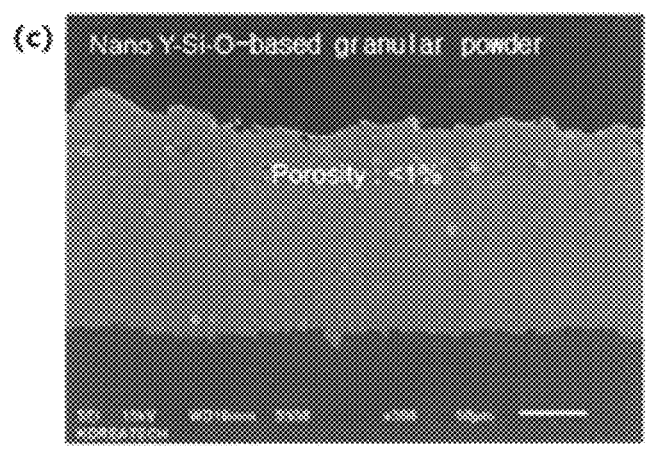

Thermal spray materials prepared in Preparation Examples 1, 2, and 4 and a plasma gun were used to produce thermal spray coatings. The plasma gun generated a plasma flame at 40 kW to 50 kW in the flow of argon and hydrogen gases as heat source gases. Each feed powder was heated and melted by the plasma flame to form a coating on a substrate. The coating was formed to a thickness of 150 μm to 200 μm, and experimental conditions are illustrated in Table 2 below. Side scanning electron microscope (SEM) images of the produced thermal spray coatings are illustrated in FIGS. 2A, 2B, and 2C.

TABLE 2

| Plasma conditions | | | |
|---|---|---|---|
| Ar (NLPM) | Current intensity (A) | Feeder conditions Feed rate (g/min) | Distance (mm) |
| 48 | 600 | 20 | 150 |

Experimental Example 1: Observation of Thermal Spray Coating

FIGS. 2A, 2B, and 2C are side scanning electron microscope (SEM) images, respectively, of thermal spray coatings according to Comparative Examples 1 to 2 and Example 1 according to the present disclosure. Through the side scanning electron microscope (SEM) images illustrated in FIGS. 2A, 2B, and 2C, it was confirmed that dense thermal spray coatings with low porosity were obtained according to the present disclosure.

The measurement of porosity was performed as follows. Each of the thermal spray coatings was cut along a plane orthogonal to the substrate surface. The resulting cross-section was resin-filled and polished, and then an image of the cross-section was taken with an electron microscope (JS-6010 available from JEOL) (FIGS. 2A, 2B, and 2C). The image was analyzed by image analysis software (Image Pro available from MEDIA CYBERNETICS) to identify pore areas in the cross-section image. The ratio of the pore areas to the entire cross-section was calculated to determine the porosity, and the results are illustrated in Table 3 below.

TABLE 3

| | | Constituent ratio of thermal spray coating | | | Measurement Data | | | |
|---|---|---|---|---|---|---|---|---|
| Classification | Material | Y | Si | O | Porosity (%) | Hardness (Hv) | Roughness (Ra, μms) | Deposition rate (μm/pass) |
| Comparative Example 1 | Preparation Example 1 | | | | 3~6 | 400~450 | 4.6~5.3 | >8 |
| Comparative Example 2 | Preparation Example 2 | 78.51 | 0.62 | 20.87 | <1.0 | 400~450 | 3.2~3.9 | >9 |
| Example 1 | Preparation Example 4 | 77.91 | 0.55 | 21.51 | <1.0 | 450~500 | 3.1~3.7 | >10 |

The thermal spray coating produced in Comparative Example 1 exhibited a porosity of equal to or greater than 3%, whereas the thermal spray coating produced in Example 1 exhibited a porosity of less than 1%. This indicates that the density of the yttrium-based thermal spray coating according to the present disclosure was increased compared to the conventional thermal spray coating.

Figure 3:
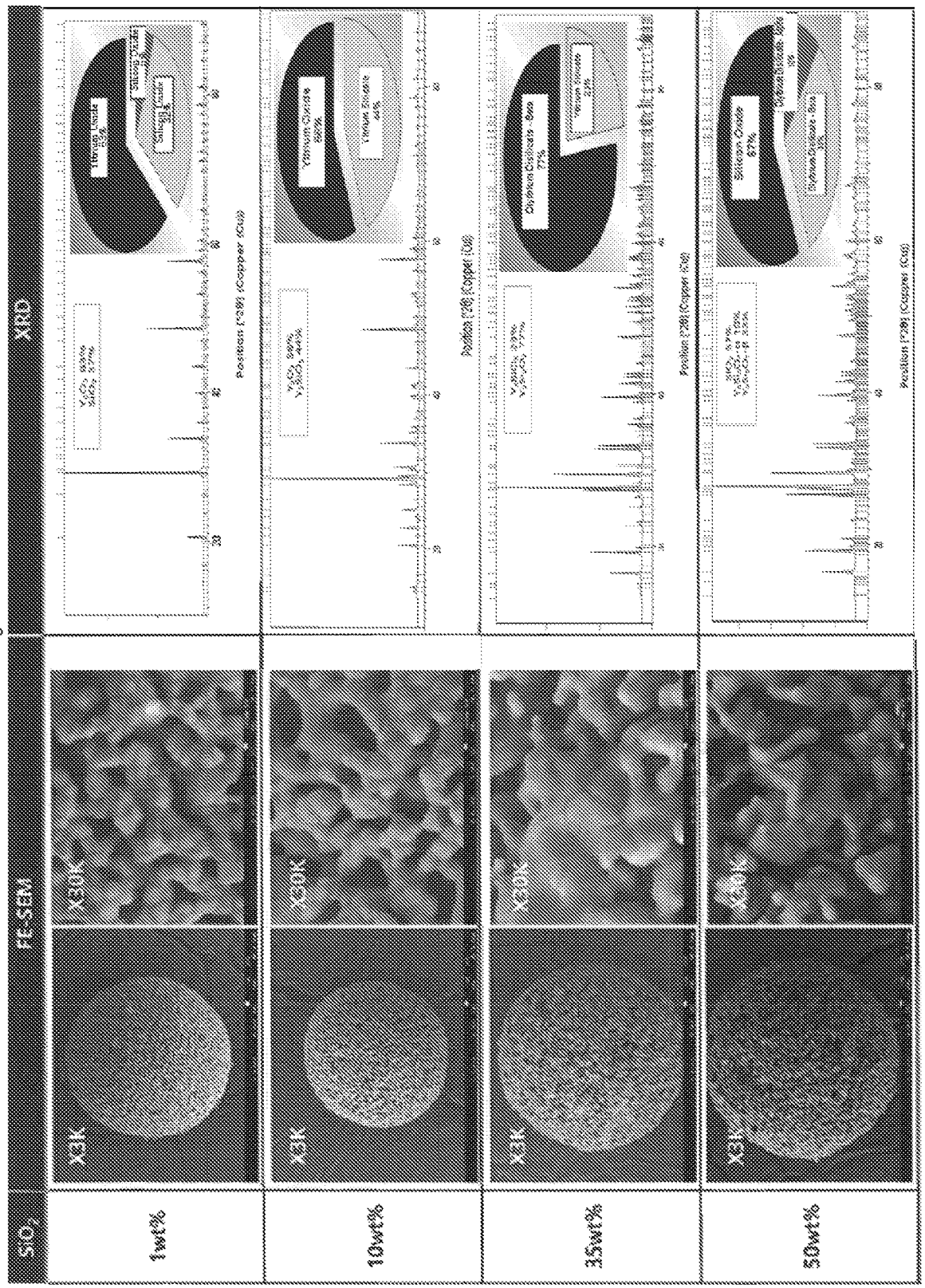
FIG. 3 is a view illustrating scanning electron microscope (SEM) images and X-ray diffraction analysis (XRD) results of yttrium-based granular powders for thermal spraying according to Preparation Examples 4 to 7 of the present disclosure.

Furthermore, as a result of analyzing the form and constituent of granular powder according to the content of silica powder in FIG. 3, it was confirmed that in the granular powder prepared in Preparation Example 4, micropores were present in a state in which primary particles remained, whereas in the granular powders prepared in Preparation Examples 5 to 7 in which the content of silica powder exceeded the range of the present disclosure, grain growth of primary or secondary particles occurred, with the result that the size of micropores in the granular powders was increased, thereby lowering the density of the granular powders.

Experimental Example 2: Measurement of Hardness

In Table 3 above, the column headed "Hardness" shows the measurement result of the Vickers hardness of each thermal spray coating. The Vickers hardness (HV 0.2) was determined using a micro hardness tester with a test load of 294.2 mN applied by a diamond indenter having an apical angle of 136°.

As illustrated in Table 3 above, it was confirmed that the thermal spray coating produced in Example 1 exhibited superior hardness than the thermal spray coatings produced in Comparative Examples 1 and 2.

Experimental Example 3: Measurement of Roughness

The roughness (μm) of each of the coatings produced in Example and Comparative Examples of the present disclosure was measured with a roughness tester (SJ-201), and the results are illustrated in Table 3 above.

Experimental Example 4: Measurement of Deposition Rate

The thickness of each of the coatings produced in Examples and Comparative Examples of the present disclosure was observed on a cross-sectional SEM image, and a value obtained by dividing the thickness by the number of times a corresponding coating process was performed is illustrated in Table 3 above.

While the exemplary embodiments of the disclosure have been described above, the embodiments are only examples of the disclosure, and it will be understood by those skilled in the art that the disclosure can be modified in various forms without departing from the technical spirit of the disclosure. Therefore, the scope of the disclosure should be determined on the basis of the descriptions in the appended claims, not any specific embodiment, and all equivalents thereof should belong to the scope of the disclosure.

What is claimed is:

1. An yttrium-based granular powder for thermal spraying, the yttrium-based granular powder comprising:
   at least one yttrium compound powder selected from the group consisting of $Y_2O_3$, YOF, $YF_3$, $Y_4Al_2O_9$, $Y_3Al_5O_{12}$, and $YAlO_3$; and a silica ($SiO_2$) powder,
   wherein the yttrium-based granular powder is prepared by mixing the yttrium compound powder having a mean grain diameter of 50 nm to 900 nm with the silica powder having a mean grain diameter of 50 nm to 900 nm, and
   the yttrium-based granular powder has a mean grain diameter of 5 μm to 50 μm and comprises greater than 0 wt % and less than 10 wt % of a Y—Si—O mesophase.

2. The yttrium-based granular powder of claim 1, wherein the yttrium-based granular powder has an apparent density of 1.25 g/cm² to 1.4 g/cm².

3. The yttrium-based granular powder of claim 1, wherein a weight ratio of the silicon element to the yttrium element (Si/Y) is 0.3 to 1.00.

4. The yttrium-based granular powder of claim 1, wherein the yttrium-based granular powder is prepared by mixing 90 mass % to 99.9 mass % of the yttrium compound powder with 0.1 mass % to 10 mass % of the silica powder.

5. The yttrium-based granular powder of claim 1, further comprising at least one compound selected from the group consisting of lithium oxide (LiO), magnesium oxide (MgO), calcium oxide (CaO), and calcium carbonate ($CaCO_3$).

6. The yttrium-based granular powder of claim 5, wherein the yttrium-based granular powder is prepared by mixing 90 mass % to 99.9 mass % of the yttrium compound powder and 0.09 mass % to 9 mass % of the silica powder, with 0.01 mass % to 1 mass % of at least one compound powder selected from the group consisting of lithium oxide (LiO), magnesium oxide (MgO), calcium oxide (CaO), and calcium carbonate ($CaCO_3$).

7. The yttrium-based granular powder of claim 5, wherein the yttrium-based granular powder comprises greater than 0 wt % and less than 10 wt % of at least one A-Y—Si—O mesophase,
   wherein A is at least one element selected from the group consisting of Li, Mg, and Ca.

8. A method of producing an yttrium-based granular powder for thermal spraying, the method comprising:
   (a) preparing a mixture by mixing at least one yttrium compound powder selected from the group consisting of $Y_2O_3$, YOF, $YF_3$, $Y_4Al_2O_9$, $Y_3Al_5O_{12}$, and $YAlO_3$, with a silica ($SiO_2$) powder;
   (b) preparing a granular powder by granulating the mixture; and
   (c) sintering the granular powder at 1200° C. to 1450° C. to obtain an yttrium-based granular powder,
   wherein each of the yttrium compound powder and the silica powder has a mean grain diameter of 50 nm to 900 nm, and
   the yttrium-based granular powder has a mean grain diameter of 5 μm to 50 μm and comprises greater than 0 wt % and less than 10 wt % of a Y—Si—O mesophase.

9. A method of producing an yttrium-based granular powder, the method comprising:
   (a) preparing a mixture by mixing at least one yttrium compound powder selected from the group consisting of $Y_2O_3$, YOF, $YF_3$, $Y_4Al_2O_9$, $Y_3Al_5O_{12}$, and $YAlO_3$, with a silica ($SiO_2$) powder, and with at least one compound powder selected from the group consisting of lithium oxide (LiO), magnesium oxide (MgO), calcium oxide (CaO), and calcium carbonate ($CaCO_3$);
   (b) preparing a granular powder by granulating the mixture; and
   (c) sintering the granular powder at 1200° C. to 1450° C. to obtain an yttrium-based granular powder,
   wherein each of the yttrium compound powder, the silica ($SiO_2$) powder, and the compound powder has a mean grain diameter of 50 nm to 900 nm, and
   the yttrium-based granular powder has a mean grain diameter of 5 μm to 50 μm and comprises greater than 0 wt % and less than 10 wt % of an A-Y—Si—O mesophase,
   wherein A is at least one element selected from the group consisting of Li, Mg, and Ca.

10. An yttrium-based thermal spray coating formed on a substrate by thermal spraying of the yttrium-based granular powder produced by the method of claim 8.

11. The yttrium-based thermal spray coating of claim 10, wherein the silicon element is partially vaporized during production of the yttrium-based thermal spray coating.

* * * * *